United States Patent [19]

Caserta et al.

[11] Patent Number: 4,920,704

[45] Date of Patent: May 1, 1990

[54] GRINDING WHEEL CONTAINING DISSOLVABLE GRANULAR MATERIAL

[75] Inventors: Richard T. Caserta; Roy E. Zimmerman, both of Lansdale, Pa.

[73] Assignee: Red Hill Grinding Wheel Corporation, Pennsburg, Pa.

[21] Appl. No.: 76,627

[22] Filed: Jul. 23, 1987

[51] Int. Cl.$^5$ .............................................. C09K 3/14
[52] U.S. Cl. ........................................ 51/302; 51/298; 125/11.01
[58] Field of Search ................ 51/298, 302; 125/11 R

[56] References Cited

U.S. PATENT DOCUMENTS

| | | | |
|---|---|---|---|
| 2,463,678 | 3/1949 | Buckey | 51/302 |
| 2,463,679 | 3/1949 | Buckey | 51/302 |
| 3,420,681 | 2/1969 | Karrip | 51/302 |
| 4,654,051 | 3/1987 | Orita et al. | 51/298 |
| 4,682,988 | 7/1987 | Narayanau et al. | 51/298 |

*Primary Examiner*—Paul Lieberman
*Assistant Examiner*—Willie J. Thompson
*Attorney, Agent, or Firm*—Caesar, Rivise, Bernstein, Cohen & Pokotilow, Ltd.

[57] ABSTRACT

A grinding wheel for use in precision wet grinding which involves the use of a water soluble based coolant. The grinding wheel includes a mix of at least an abrasive and a resin and also an effective amount of a relatively coarse granular water soluble material. Such material is inert to the other components of the mix and achieves a relatively neutral or slight alkaline pH in water solution. As the grinding wheel is used in wet grinding, the surface of the grinding wheel is gradually worn away to expose granules of the water soluble material to the coolant. This causes dissolving of the granules to form clearance pores to aid the free grinding action of the wheel.

7 Claims, No Drawings

GRINDING WHEEL CONTAINING DISSOLVABLE GRANULAR MATERIAL

BACKGROUND OF THE INVENTION

This invention relates to grinding wheels and specifically the abrasive mixture which is formed and then molded or pressed into the final grinding wheel.

There is a class of grinding wheels which are used in so-called precision grinding which is a grinding process involving the use of a grinding coolant and is therefore termed wet grinding. Precision grinding is important in various operations, such as in the cutlery trade to form edges on knives and scissors as well as in grinding of steel rolls or in centerless grinding and between centers grinding to form parts accurately to size and required finish.

In precision grinding it is the practice to use a grinding coolant in what may be termed as wet grinding. The conventional grinding coolant is usually water based and includes rust inhibitors and grinding aids.

Precision grinding traditionally has been performed by conventional pressed vitrified or resin bonded wheels.

A new class of wheels now being used in these operations are bonded using liquid resins such as epoxies, polyester or other engineering resins. These wheels are cast to size rather than formed in hydraulic presses.

In order to improve the grinding action of this type of wheel it has been determined that it is beneficial to induce a controlled amount of porosity in the wheel.

Several materials such as Alumina bubbles, silica spheres, and micro balloons have been used for this purpose. All of them have exhibited shortcomings or excessive cost that have reduced their effectiveness as pore formers.

It is accordingly an object of the invention to provide a grinding wheel containing a dissolvable granular material which is sufficiently coarse to provide a controlled induced porosity to aid the free grinding action of the grinding wheel.

Another object of the present invention is to provide a grinding wheel containing water soluble granular material which will stay essentially unchanged during the manufacturing process.

Yet another object of the present invention is to provide a grinding wheel containing dissolvable granular material which does not add undue expense and which does not adversely effect the strength of the wheel.

The foregoing as well as other objectives of the invention are achieved by providing a grinding wheel for use in precision wet grinding, for instance, with a water based coolant. The grinding wheel contains a mix of at least an abrasive and a resin and also includes an effective amount of a relatively coarse, granular water soluble material, such as ordinary cane sugar or other material which is essentially inert to the other components of the mix. As the grinding wheel is used in wet grinding the surface of the grinding wheel is gradually worn away to expose certain of the dissolvable granular materials to the coolant. The action of the coolant causes dissolving of the granulars to form clearance pores to aid the free grinding action of the wheel.

The invention basically involves including in the abrasive mix, a material having the following properties:

1. Granular
2. Water soluble
3. Essentially inert to other components of the abrasive mix
4. Achieves a relatively neutral or mild alkaline pH in solution.

The material is preferably organic, although the invention is not necessarily limited thereto since the invention could include any dissolvable inorganic materials which meet the abovenoted four criteria.

The preferred dissolvable material is ordinary cane sugar but other water soluble granular materials can be used. However, the invention contemplates organic and even inorganic granular materials which meet the four criteria set forth hereinabove. It is believed that sodium tripolyphosphate and trisodium phosphate (both known water softeners) will meet these criteria.

The invention has worked satisfactorily using ordinary granular sugar. Obviously the size of pores induced in the wheel is controlled by the size of the granular material. It is necessary to use a size of material that is suitable for the particular grinding parmeters. Obviously too fine or too coarse a material may not produce the desired results. Therefore, for different grinding applications, different size pore formers may be required.

The particle sizes contemplated for use do not have a significant effect on the strength of the completed wheel. The quantity used has a more significant effect on strength, but the effect is approximately the same as if the porosity had been achieved by other means.

An important aspect of the invention is that the sugar is not chemically bound in the mix. It continues to exist in discrete particles. As the working face of the grinding wheel is worn away, the sugar in the wheel becomes exposed to the grinding coolant which dissolves away the various exposed surface particles to create a significant controlled porosity. This results in a grinding wheel of superior properties to permit precision grinding. A preferred particles size range for the is in the range of 36 to 60 Tyler mesh, although other particles sizes are acceptable or discussed hereinafter.

It is believed that the particle size of the cane sugar may be as large as 16 Tyler mesh and as small as 120 Tyler mesh. However, it is contemplated that with coarser abrasives that a particle size larger than 16 Tyler Mesh can be used depending upon the coarseness of the abrasive.

If the sugar is too fine, the pores to be formed will be too small or the very fine sugar particles will move into the natural pores of the wheel and thus may not create additional porosity.

The sugar is preferrably present in the mix in the amount of 10 to 20% by weight, although this may vary. It is believed that the sugar may be present in an amount as high as 40% by weight, but it should be kept in mind that with such a large presence of sugar the strength of the wheel decreased substantially. On the other hand, it is believed that the invention is workable with an amount of sugar as low as 5%.

By the term 'free grinding" it should be understood that the grinding wheel in use will achieve an effective grinding action without burn or loading.

The advantage in using sugar or other granular substance is that there is achieved a uniform distribution of pores throughout the grinding wheel.

The sugar is preferably present in the mix in an amount of 10 to 20% by weight, although this may to reviewed more carefully.

Sieve analysis of cane sugar used in the following formulations.

| Tyler Sieve | % |
| --- | --- |
| 20 | 1.5 |
| 24 | 1.5 |
| 30 | 4.0 |
| 36 | 15.0 |
| 46 | 38.0 |
| 60 | 30.0 |
| thru 60 | 10.0 |

Formulation A (no soluable filler)

| | |
| --- | --- |
| Aluminum oxide abrasive and insoluble filler | 40% by volume (70% by weight) |
| Soluble filler (sugar) | 0 |
| Bond #236 | 60% by volume (30% by weight) |

Formulation B (formulation "A: modified with soluble filler

| | |
| --- | --- |
| Aluminum oxide abrasive | 36% by volume (64.9% by weight) |
| Soluble filler (filler) | 10% by volume (7.3% by weight) |
| Bond #236 | 54% by volume (27.8% by weight) |

Bond #236 is a bisphenol-A epoxy resin and amine adduct hardener in a stoichiometric ratio.

Strength test results:

7" × ¾ × 1" bars tested to failure in 3 point bending in a universal testing machine.

RESULTS:
Modulus of rupture
Formulation "A" 5472 psi
Formulation "B" 4864 psi

Although there is a reduction of strength, the reduction is approximately equivalent to the reduction in strength that would occur if 10% by volume of pores had been induced into the test bars.

This proves that the filler is not bonding to the resin, and is just beng encapsulated.

Even though the strength is reduced, there is sufficient strength in all formulations with soluble filler volumes from 10% to 40%.

The inclusion of sugar in an epoxy resin mix has proved to be quite successful. The manufacturing procedure involves mixing together the abrasive, sugar and fillers (if any). Then, the aforesaid mixture is combined with the epoxy mix, catalyst, plasticizers and hardener. All of the foregoing occurs at a temperature range of 25° C. to 70° C. The potting time for this kind of mix is approximately ten to thirty minutes. In the case of a thermosetting resin like phenol formaldehyde there is no potting time. Instead, cure occurs at elevated tempreature in the range of 150° C. to 190° C.

It is necessary that the resin-abrasive mixture be curable at a temperature below the decomposition temperature of the sugar. This is why the epoxy formulation is preferred because of the room temperature or slightly elevated temperature (up to 70° F.) curing the mix. However, non-epoxy mixes are contemplated.

The following table shows on a volume basis percentage another formulation with a different bond blend and various levels of soluble filler with weight percentages being shown in parenthesis:

| FORMULA | % Al$_2$O$_3$ | % Iron Oxide | % Soluble Filler | % 2207 Bond | Modulus Rupture PSI |
| --- | --- | --- | --- | --- | --- |
| 1 | 39.0(66.2) | 1.0(2.3) | 0(0) | 60.0(31.5) | 3589 |
| 2 | 32.0(58.5) | 0.5(1.3) | 10(7.7) | 57.5(32.5) | 3267 |
| 3 | 28.0(52.2) | 1.0(2.6) | 20(15.8) | 51.0(29.4) | 2552 |
| 4 | 19.0(39.6) | 0.5(1.4) | 30(26.5) | 50.5(32.5) | 2552 |
| 5 | 11.0(25.9) | 1.0(3.0) | 40(37.9) | 48.0(33.2) | 2059 |

*Weight % in Parenthesis

Bond #2207 is a bisphenol-a-epoxy resin with an epoxy terminated elastomeric copolymer, sulfur and an amine adduct hardener in stoichiometric ratios.

To show the impermiability of the bond with the soluble filler we conducted a 7 day soak test.

The test involved test bars having dimensions as the test bars of formulations A and B in the strength test. The test bars were immersed in water for seven days.

For each of the formulations two sets of bars were soaked. One set was as cast. The second set had the resin "skin" ground off the bars to expose the soluble filler. These results are compared to the bars of the same formulation tested without being soaked.

| Formulation | Soak Time | Surface Finish | Modulus of Rupture (psi) |
| --- | --- | --- | --- |
| A | 0 | As cast | 5075 |
| A | 7 day | As cast | 5790 |
| A | 7 day | All surfaces Ground | 5473 |
| B | 0 | As cast | 4506 |
| B | 7 day | As cast | 4595 |
| B | 7 day | All surface Ground | 4524 |

The above results show that there is no lowering of strength because of the 7 day water soaking. This shows the encapsulated surface is basically unreachable until the grinding action is started.

Without further elaboration the foregoing will so fully illustrate my invention that others may, by applying current or future knowledge, adopt the same for use under various conditios of service.

What is claimed is:

1. In a grinding wheel for use in precision wet grinding involving the use of a water base coolant, said wheel comprising at least an abrasive and a resin, the improvement comprising the presence in said wheel of an effective amount of a randomly distributed, relatively coarse granular water soluble material to achieve a controlled amount of porosity in the wheel during wet grinding, said material being inert to the other components of said mix and achieving a relatively neutral or mild alkaline pH in water solution during wet grinding, and wherein said relatively coarse water soluble material is not materially changed during any process for making said wheel, and whereby as said wheel is used in wet grinding, the surface of said wheel is gradually worn away to expose granules of said material to said coolant, thereby causing the dissolving of said granules to form clearance pores to aid the free grinding action of the wheel.

2. The grinding wheel of claim 1 wherein said water soluble material is cane sugar.

3. The grinding wheel of claim 2 wherein said can sugar as a particle size in the range of 36 to 60 Tyler mesh.

4. The grinding wheel of claim 2 wherein said water soluble material has a particle size of from 16 Tyler mesh to 120 Tyler mesh.

5. The grinding wheel of claim 1 wherein the resin includes an epoxy resin.

6. The grinding wheel of claim 1 wherein the resin includes a polyester resin.

7. The grinding wheel of claim 1 wherein the resin includes a phenol formaldenhyde resin.

* * * * *